(12) United States Patent
Zhang et al.

(10) Patent No.: US 10,979,159 B2
(45) Date of Patent: Apr. 13, 2021

(54) RADIO LINK MONITORING TEST PROCEDURES FOR WIRELESS DEVICES

(71) Applicant: NOKIA TECHNOLOGIES OY, Espoo (FI)

(72) Inventors: Li Zhang, Beijing (CN); Ren Da, Warren, NJ (US); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 132 days.

(21) Appl. No.: 16/327,662

(22) PCT Filed: Aug. 21, 2017

(86) PCT No.: PCT/EP2017/071002
§ 371 (c)(1),
(2) Date: Feb. 22, 2019

(87) PCT Pub. No.: WO2018/036950
PCT Pub. Date: Mar. 1, 2018

(65) Prior Publication Data
US 2019/0181969 A1 Jun. 13, 2019

Related U.S. Application Data

(60) Provisional application No. 62/379,008, filed on Aug. 24, 2016.

(51) Int. Cl.
*H04B 17/336* (2015.01)
*H04L 5/00* (2006.01)
(Continued)

(52) U.S. Cl.
CPC .......... *H04B 17/336* (2015.01); *H04B 17/30* (2015.01); *H04L 5/00* (2013.01); *H04L 5/0048* (2013.01); *H04W 24/08* (2013.01)

(58) Field of Classification Search
CPC ......... H04B 17/336; H04B 17/30; H04L 5/00; H04L 5/0048; H04W 24/08
See application file for complete search history.

(56) References Cited

U.S. PATENT DOCUMENTS

| 2015/0271763 A1* | 9/2015 | Balachandran ..... H04L 43/0811 370/338 |
| 2016/0278103 A1* | 9/2016 | Kazmi ................. H04L 5/0048 |
| 2017/0170941 A1* | 6/2017 | Yang ..................... H04L 5/0098 |

FOREIGN PATENT DOCUMENTS

| DE | 11 2014 005 033 T5 | 8/2016 |
| WO | WO 2014/077766 A1 | 5/2014 |
| WO | WO 2015/112072 A1 | 7/2015 |

OTHER PUBLICATIONS

International Search Report and Written Opinion dated Oct. 16, 2017 corresponding to International Patent Application No. PCT/EP2017/071002.

* cited by examiner

*Primary Examiner* — Shailendra Kumar
(74) *Attorney, Agent, or Firm* — Squire Patton Boggs (US) LLP

(57) ABSTRACT

A technique includes maintaining a signal-to-noise ratio of the transmitted reference signals to be less than a lower signal-to-noise ratio threshold for a first period of time that is a sufficient length of time to allow a correctly operating user device to detect an out-of-sync status and subsequently declare a radio link failure with respect to the connection, increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold, after the increasing, sending, by the network device to the user device, an uplink (Continued)

resource grant, and confirming that the network device does not receive an uplink transmission from the user device in response to the uplink resource grant within a second period of time.

21 Claims, 8 Drawing Sheets

(51) Int. Cl.
*H04B 17/30* (2015.01)
*H04W 24/08* (2009.01)

RADIO LINK MONITORING TEST PROCEDURES FOR WIRELESS DEVICES

TECHNICAL FIELD

This description relates to communications, and in particular, to radio link monitoring test procedures for wireless devices.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

For reliable and efficient communication in a wireless system, a user device or UE that is connected to a serving cell or base station (BS) may monitor its downlink radio link quality and determine whether it is in out-of-sync (OOS) or in in-sync (IS) status. The procedure may be referred to as Radio Link Monitoring (RLM).

SUMMARY

According to an example implementation, a method is provided for performing an out-of-sync test procedure for a wireless user device, the method including: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; maintaining, after the increasing, the signal-to-noise ratio of the transmitted reference signals to at least the third signal-to-noise ratio for a second period of time that is a sufficient length of time to allow a correctly operating user device to perform connection re-establishment after previously declaring a radio link failure with respect to the connection; and confirming, by the network device from the user device, a receipt of a random access preamble for connection re-establishment from the user device.

According to an example implementation, an apparatus includes at least one processor and at least one memory including computer instructions, when executed by the at least one processor, cause the apparatus to: establish, by a network device, a connection with a user device; decrease, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintain, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; increase, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; maintain, after the increasing, the signal-to-noise ratio of the transmitted reference signals to at least the third signal-to-noise ratio for a second period of time that is a sufficient length of time to allow a correctly operating user device to perform connection re-establishment after previously declaring a radio link failure with respect to the connection; and confirm, by the network device from the user device, a receipt of a random access preamble for connection re-establishment from the user device.

According to an example implementation, an apparatus includes means for establishing, by a network device, a connection with a user device; means for decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; means for maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; means for increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; means for maintaining, after the increasing, the signal-to-noise ratio of the transmitted reference signals to at least the third signal-to-noise ratio for a second period of time that is a sufficient length of time to allow a correctly operating user device to perform connection re-establishment after previously declaring a radio link failure with respect to the connection; and means for confirming, by the network device from the user device, a receipt of a random access preamble for connection re-establishment from the user device.

According to an example implementation, a computer program product includes a computer-readable storage medium and storing executable code that, when executed by at least one data processing apparatus, is configured to cause the at least one data processing apparatus to perform a method including: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; maintaining, after the increasing, the signal-to-noise ratio of the transmitted reference signals to at least the third signal-to-noise ratio for a second period of time that is a sufficient length of time to allow a correctly operating user device to perform connection re-establishment after previously declaring a radio link failure with respect to the connection; and confirming, by the network device from the user device, a receipt of a random access preamble for connection re-establishment from the user device.

According to an example implementation, a method of performing an out-of-sync test procedure for a wireless user device is provided and includes: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; transmitting, after the increasing, by the network device to the user device, an uplink resource grant; and confirming that the network device does not receive an uplink transmission from the user device in response to the uplink resource grant within a second period of time.

According to an example implementation, an apparatus includes at least one processor and at least one memory including computer instructions, when executed by the at least one processor, cause the apparatus to: establish, by a network device, a connection with a user device; decrease, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintain, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; increase, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; transmit, after the increasing, by the network device to the user device, an uplink resource grant; and confirm that the network device does not receive an uplink transmission from the user device in response to the uplink resource grant within a second period of time.

According to an example implementation, an apparatus includes means for establishing, by a network device, a connection with a user device; means for decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; means for maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; means for increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; means for transmitting, after the increasing, by the network device to the user device, an uplink resource grant; and means for confirming that the network device does not receive an uplink transmission from the user device in response to the uplink resource grant within a second period of time.

According to an example implementation, a computer program product includes a computer-readable storage medium and storing executable code that, when executed by at least one data processing apparatus, is configured to cause the at least one data processing apparatus to perform a method including: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; transmitting, after the increasing, by the network device to the user device, an uplink resource grant; and confirming that the network device does not receive an uplink transmission from the user device in response to the uplink resource grant within a second period of time.

According to an example implementation, a method of performing an in-sync test procedure for a wireless user device includes: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; transmitting, after the increasing, by the network device to the user device, an uplink resource grant; and confirming that the network device receives an uplink transmission from the user device in response to the uplink resource grant within a second period of time.

According to an example implementation, an apparatus includes at least one processor and at least one memory including computer instructions, when executed by the at least one processor, cause the apparatus to: establish, by a network device, a connection with a user device; decrease, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintain, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; increase, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; transmit, after the increasing, by the network device to the user device, an uplink resource grant; and confirm that the network device receives an uplink transmission from the user device in response to the uplink resource grant within a second period of time.

According to an example implementation, an apparatus includes means for establishing, by a network device, a connection with a user device; means for decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; means for maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; means for increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; means for transmitting, after the increasing, by the network device to the user device, an uplink resource grant; and means for confirming that the network device receives an uplink transmission from the user device in response to the uplink resource grant within a second period of time.

According to an example implementation, a computer program product includes a computer-readable storage medium and storing executable code that, when executed by at least one data processing apparatus, is configured to cause the at least one data processing apparatus to perform a method including: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; transmitting, after the increasing, by the network device to the user device, an uplink resource grant; and confirming that the network device receives an uplink transmission from the user device in response to the uplink resource grant within a second period of time.

According to an example implementation, a method of performing an in-sync test procedure for a wireless user device includes: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is less than an upper signal-to-noise ratio threshold and greater than a lower signal-to-noise ratio threshold; maintaining, after the increasing, a signal-to-noise ratio of the transmitted reference signals to be less than the upper signal-to-noise ratio threshold and greater than the lower signal-to-noise ratio threshold for a second period of time that is a sufficient length of time to allow a correctly operating user device to declare a radio link failure with respect to the connection; transmitting, by the network device to the user device after the maintaining a signal-to-noise ratio of the transmitted reference signals to be less than the upper signal-to-noise ratio threshold and greater than the lower signal-to-noise ratio threshold for the second period of time, an uplink resource grant; and confirming that the network device does not receive an uplink transmission from the user device in response to the uplink resource grant within a third period of time.

According to an example implementation, an apparatus includes at least one processor and at least one memory including computer instructions, when executed by the at least one processor, cause the apparatus to: establish, by a network device, a connection with a user device; decrease, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintain, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; increase, after the maintaining, the signal-to-noise ratio of the reference signals transmitted to the user device from the second signal-to-noise ratio to a third signal-to-noise ratio, wherein the third signal-to-noise ratio is less than an upper signal-to-noise ratio threshold and greater than a lower signal-to-noise ratio threshold; maintain, after the increasing, a signal-to-noise ratio of the transmitted reference signals to be less than the upper signal-to-noise ratio threshold and greater than the lower signal-to-noise ratio threshold for a second period of time that is a sufficient length of time to allow a correctly operating user device to declare a radio link failure with respect to the connection; transmit, by the network device to the user device after the maintaining a signal-to-noise ratio of the transmitted reference signals to be less than the upper signal-to-noise ratio threshold and greater than the lower signal-to-noise ratio threshold for the second period of time, an uplink resource grant; and confirm that the network device does not receive an uplink transmission from the user device in response to the uplink resource grant within a third period of time.

According to an example implementation, an apparatus includes means for establishing, by a network device, a connection with a user device; means for decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; means for maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; means for increasing, after the maintaining, the signal-to-noise ratio of the reference signals transmitted to the user device from the second signal-to-noise ratio to a third signal-to-noise ratio, wherein the third signal-to-noise ratio is less than an upper signal-to-noise ratio threshold and greater than a lower signal-to-noise ratio threshold; means for maintaining, after the increasing, a signal-to-noise ratio of the transmitted reference signals to be less than the upper signal-to-noise ratio threshold and greater than the lower signal-to-noise ratio threshold for a second period of time that is a sufficient length of time to allow a correctly operating user device to declare a radio link failure with respect to the connection; means for transmitting, by the network device to the user device after the maintaining a signal-to-noise ratio of the transmitted reference signals to be less than the upper signal-to-noise ratio threshold and greater than the lower signal-to-noise ratio threshold for the second period of time, an uplink resource grant; and means for confirming that the network device does not receive an uplink transmission from the user device in response to the uplink resource grant within a third period of time.

According to an example implementation, a computer program product includes a computer-readable storage medium and storing executable code that, when executed by at least one data processing apparatus, is configured to cause the at least one data processing apparatus to perform a method including: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is less than an upper signal-to-noise ratio threshold and greater than a lower signal-to-noise ratio threshold; maintaining, after the increasing, a signal-to-noise ratio of the transmitted reference signals to be less than the upper signal-to-noise ratio threshold and greater than the lower signal-to-noise ratio threshold for a second period of time that is a sufficient length of time to allow a correctly operating user device to declare a radio link failure with respect to the connection; transmitting, by the network device to the user device after the maintaining a signal-to-noise ratio of the transmitted reference signals to be less than the upper signal-to-noise ratio threshold and greater than the lower signal-to-noise ratio threshold for the second period of time, an uplink resource grant; and confirming that the network device does not receive an uplink transmission from the user device in response to the uplink resource grant within a third period of time.

The details of one or more examples of implementations are set forth in the accompanying drawings and the description below. Other features will be apparent from the description and drawings, and from the claims.

DETAILED DESCRIPTION

Figure 1:
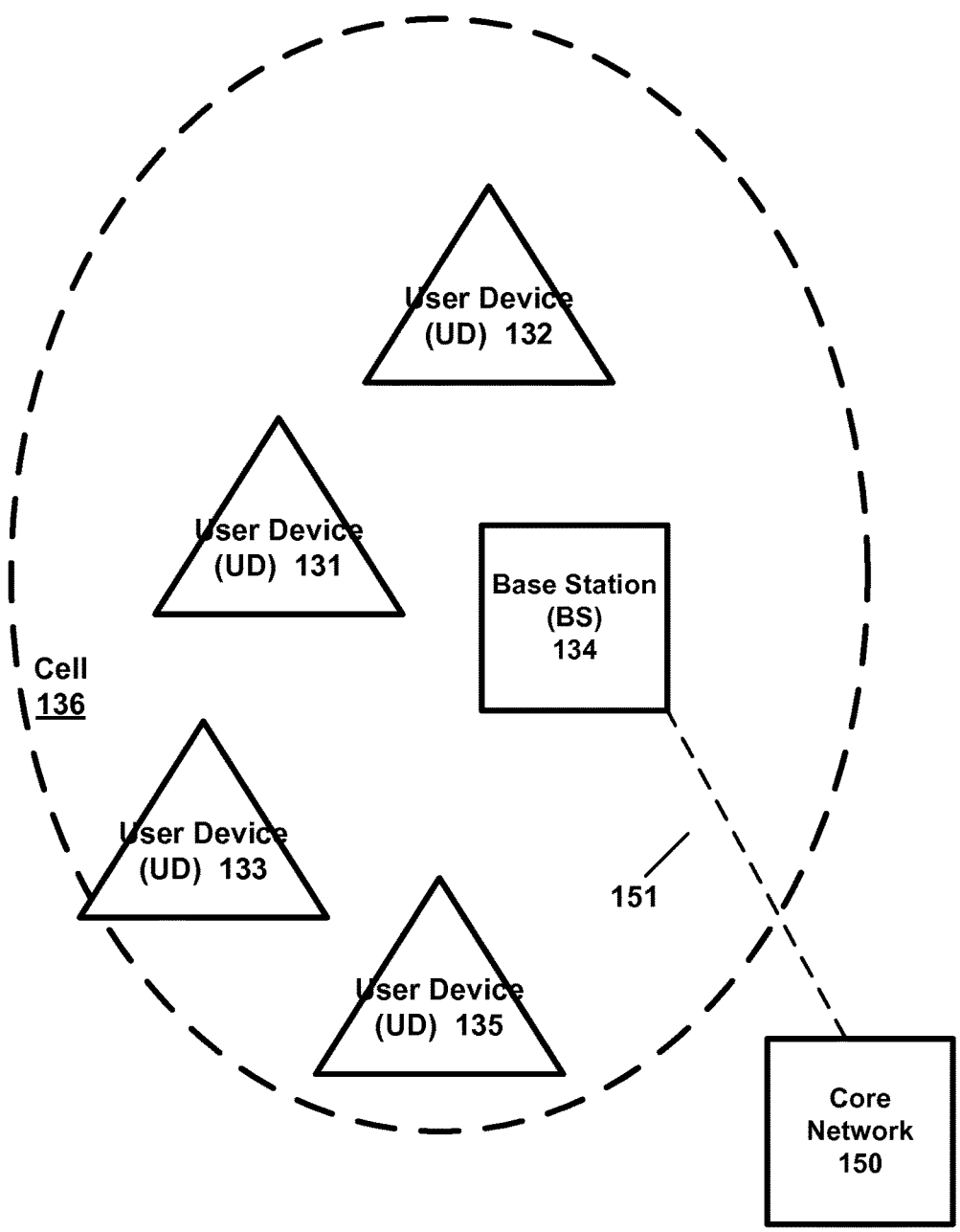
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

By way of illustrative example, the various example implementations or techniques described herein may be applied to various user devices, such as machine type communication (MTC) user devices, enhanced machine type communication (eMTC) user devices, Internet of Things (IoT) user devices, and/or narrowband IoT user devices. IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs.

Machine Type Communications (MTC, or Machine to Machine communications) may, for example, be characterized by fully automatic data generation, exchange, processing and actuation among intelligent machines, with or without intervention of humans. For example, eMTC may be an example of a narrowband user device, where the eMTC or narrowband user device is limited to transmission or reception within a narrowband. IoT and/or narrowband IoT devices may also include operation within a narrowband.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, IoT, MTC, eMTC, etc., or any other wireless network or wireless technology. These example networks or technologies are provided only as illustrative examples, and the various example implementations may be applied to any wireless technology/wireless network. Also, as noted, the various example implementations may be applied to a variety of user devices, such as, for example, user devices, UEs, mobile stations, eMTC user devices, and/or IoT or narrowband IoT user devices.

According to an example implementation, in order to support user device mobility and to decrease service interruptions, user devices may perform radio link monitoring (RLM). As part of RLM, a connected user device (e.g., connected to a serving cell/BS) may monitor a downlink radio link quality of the serving cell by measuring a link quality parameter(s) of the received downlink radio link. Thus, as part of RLM, a user device may monitor a downlink radio link quality by measuring a signal-to-noise ratio (SNR) of the cell-specific reference signals received from a serving cell/BS. The user device may compare the SNR of the downlink radio link to a lower threshold ($Q_{out}$) and/or to an upper threshold ($Q_{in}$) for the purpose of monitoring downlink radio link quality of the serving cell/BS.

According to an example implementation, the lower threshold $Q_{out}$ may be defined as a level at which the downlink radio link cannot be reliably received and may, for example, correspond to a 10% block error rate (BLER) of a hypothetical PDCCH (physical downlink control channel) transmission. The upper threshold $Q_{in}$ is defined as the level at which the downlink radio link quality can be significantly more reliably received than at $Q_{out}$ and may, for example, correspond to 2% BLER of a hypothetical PDCCH transmission.

According to an example implementation, as part of RLM, a user device may frequently or even periodically measure a link quality (e.g., SNR) of a downlink radio link, and then compare the link quality (e.g., SNR) of the downlink radio link to a lower threshold ($Q_{out}$) and/or to an upper threshold ($Q_{in}$) to determine whether it is in out-of-sync (OOS) status or in in-sync (IS) status. While SNR is used as an example link quality in one or more illustrative example implementations described herein, a variety of different link parameters or link qualities may be used for measuring or determining a downlink radio link quality, e.g., such as received signal strength, reference signal received power, error rate (e.g., block error rate), SNR, or other link quality.

According to an example implementation, there may be various rules that a correctly operating user device may follow when comparing a SNR of the downlink radio link quality (e.g., SNR) to the lower threshold ($Q_{out}$) and/or to the upper threshold ($Q_{in}$), when a user device should declare a radio link failure (RLF), what conditions should cause the user device to switch or transition between IS status and OOS status, etc. Some example operations or rules will be briefly described, by way of example.

According to an example implementation, while a user device is connected (e.g., user device is in radio resource control (RRC) connected state) with a serving BS/cell, then the user device may periodically measure SNR of reference signals received from the serving cell/BS. If the downlink radio link quality, e.g., SNR (e.g., over a last period of time period of 200 ms or other time period) is less than $Q_{out}$, then a physical (PHY) layer of the user device may send an out-of-sync (OOS) indication to higher layer(s) at the user device. Similarly, when the SNR of the downlink radio link (e.g., over a last time period of 100 ms or other time period) is greater than $Q_{in}$, then a PHY of the UE sends an in-sync (IS) indication to upper layers of the user device. If the SNR is in-between $Q_{in}$ and $Q_{out}$, then neither a IS indication nor a OOS indication is sent by the PHY (L1) to upper layers of the user device.

According to an example implementation, an upper layer of the user device may increment an OOS counter each time it receives an OOS indication. If a threshold number (e.g., 1, 2, 3, 4, . . . ) of (e.g., consecutive) OOS indications are received by the upper layers of the user device without receiving an in-sync (IS) indication from the PHY of the user device (e.g., OOS counter reaches a threshold number), then an OOS timer is started. If the OOS timer expires before an IS indication is received from the user device PHY (e.g., before a SNR is measured for the downlink radio link that is greater than $Q_{in}$), then the UE declares a radio link failure (RLF) for the radio link or connection with the serving cell or serving BS. On the other hand, if, before expiration of the OOS timer, a SNR measurement is received that is greater than Qin, then the IS counter is incremented for the user device, and the OOS timer is stopped and OOS counter is reset to zero, which prevents the user device from declaring a RLF. A SNR that is in-between $Q_{in}$ and $Q_{out}$ will not cause an OOS to be indicated to upper layers, and such an in-between SNR will not generate an IS that will stop a RLF from being triggered. Thus, once an OOS timer is started (based on one or more received OOS indications), only an IS indication (based on SNR greater than $Q_{in}$) will prevent a RLF, for example.

After declaring RLF, the user device is no longer connected, but is now disconnected from the previous serving cell/BS, which may also be referred to as idle state or RRC idle state.

Therefore, if a signal quality of a downlink radio link falls below a threshold $Q_{out}$, the user device may be expected to declare it is in out-of-sync (OOS) status, and then user device may eventually trigger or declare a Radio Link Failure (RLF) for the connection. For a user device already in out-of-sync (OOS) status, the user device may be expected to declare it comes back to in-sync (IS) status, if the downlink signal quality exceeds another predefined threshold $Q_{in}$ to avoid unnecessarily triggering RLF.

According to an example implementation, after declaring RLF, a user device may try to find and then establish a connection to the same or a different cell or BS. For example, the user device may perform cell search and measurement, which may include, for example, a user device searching for, synchronizing to, and estimating the received signal quality from one or more neighbor cells. The received signal quality of the neighboring cells. Measurement may include, e.g., the user device tuning its wireless transceiver (transmitter/receiver) to a frequency to receive synchronization signals (e.g., primary synchronization signals and secondary synchronization signals) from a cell, acquiring frequency and symbol synchronization and frame synchronization to the neighbor cell, determining a physical cell identity or cell ID of the neighbor cell, and measuring a signal quality (e.g., reference signal received power/RSRP or SNR of reference signals) of signals received from the cell. If a suitable cell has been found based on the received signal quality or link quality, then the user device may send a random access (e.g., RACH) preamble to the cell/BS for connection establishment (or re-establishment if it is the same cell as before). Once connected, the user device may resume performing RLM for the serving cell/BS.

According to an example implementation, Radio link monitoring (RLM) test procedures are described to verify that a user device is correctly operating, such as, for example, to confirm that a (correctly operating) user device properly detects whether it is in out-of-sync (OOS) or in in-sync (IS) status, and correctly declares RLF under the appropriate conditions. Several example RLM test procedures will now be briefly described.

Figure 2:
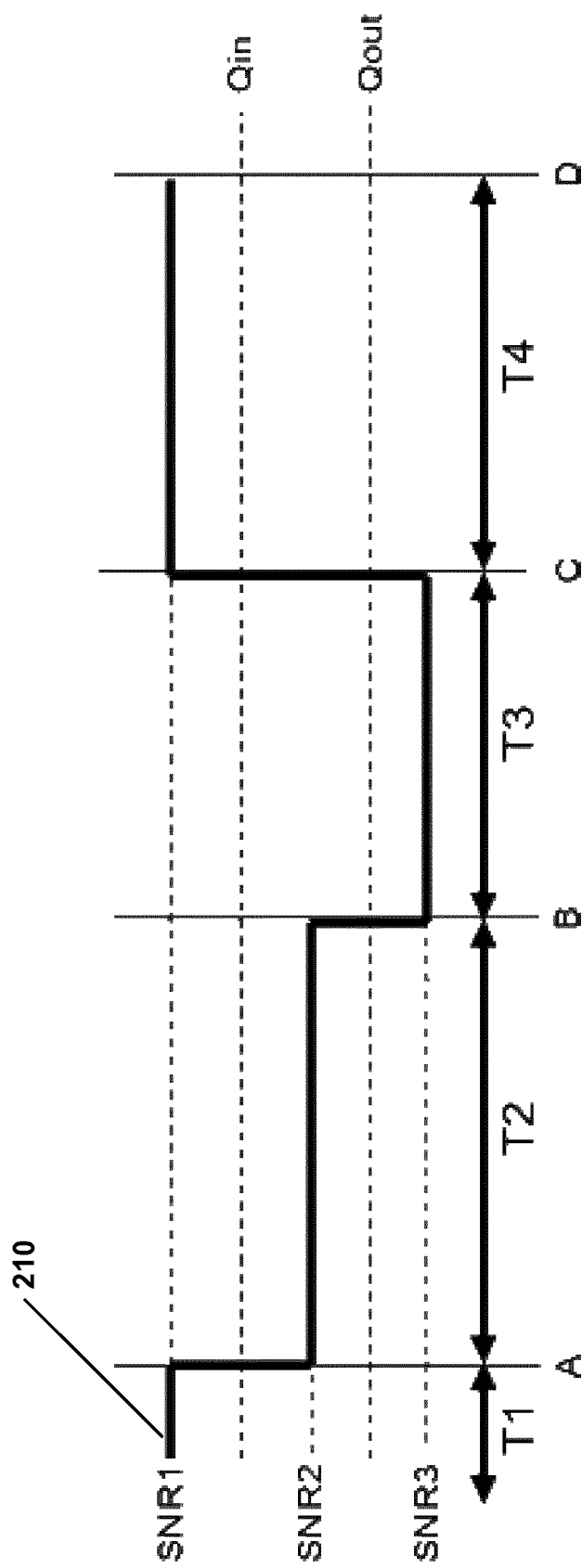
FIG. 2 is a diagram illustrating variation of received SNR for an example out-of-sync testing according to one or more example implementations.

FIG. 2 is a diagram illustrating variation of received SNR for an example out-of-sync testing according to one or more example implementations. (for testing examples 1 and 2). In FIG. 2, signal strength is shown in a vertical axis, while time is shown in the horizontal axis. The SNR of the reference signals transmitted by the serving cell/serving BS and received by the user device is indicated by received SNR value 210, which varies over time. To conduct a test of a user device, a network device (e.g., operating as a serving cell or serving BS) may vary the signal power or signal strength of one or more signals transmitted by the network device, such as the reference signals (e.g., cell specific reference signals). An upper threshold ($Q_{in}$) and a lower threshold ($Q_{out}$) are also shown in FIG. 2.

The variation over time of the received SNR 210 is shown in FIG. 2. In an example implementation, the received SNR 210 may include: SNR1 (which is greater than $Q_{in}$) during time period T1; decrease at point A from SNR1 to SNR2 (which is between $Q_{in}$ and $Q_{out}$), and stay or be maintained at SNR2 during time period T2; decrease at point B to SNR3 (which is less than $Q_{out}$), and stay or maintain at SNR3 during time period T3; increase at point C from SNR3 to SNR1, and stay or maintain at SNR1 during time period T4 up until at least point D.

An example 1 and example 2 of a RLM test procedure (e.g., for OOS testing) will now be described with reference to FIG. 2.

Example 1

Test Procedure based on RACH preamble transmission for OOS test for user devices (e.g., for eMTC and NB-IoT UEs).

1) During the time period T1, the user device sets up or establishes the connection with the serving cell, Cell 1, with a regular connection setup procedure with received SNR 210 set to a value of SNR1 (e.g. greater than Qin by offset1, with offset1 being the SNR estimation uncertainty at Qin), where this value of received SNR 210 is the SNR level for reference signals transmitted by the cell 1 and received by the user device to establish the connection to the serving cell, cell 1.

2) At point A, the received SNR 210 is decreased from SNR1 to SNR2. The value of SNR2 is set between $Q_{in}$ and $Q_{out}$, e.g., the middle of $Q_{in}$ and $Q_{out}$, or greater than $Q_{out}$ by offset2, with offset2 being the SNR estimation uncertainty at $Q_{out}$, for example.

3) During the time period T2, serving cell/BS provides the user device with an uplink resource grant, or which may be referred to as an uplink grant of resources to allow the user device to transmit on an uplink channel, such as on a physical uplink shared channel (PUSCH) or narrow band PUSCH (NPUSCH). Since SNR2 is larger than $Q_{out}$, a correctly user device is expected to maintain its connection with the serving cell (and not indicate OOS or RLF) and conduct PUSCH (NPUSCH) transmission in response to the uplink grant. On the other hand, a user device that is not operating correctly, may incorrectly indicate a OOS and RLF during period T2 based on SNR 2. Such an incorrectly operating user device will not respond to the uplink grant provided below, and thus, will fail the test. Thus, according to an example implementation, the time period T2 may be a sufficient length to allow an incorrectly operating user device to detect an out-of-sync (OOS) status and subsequently declare a radio link failure with respect to the connection.

4) At point B, the received SNR 210 is decreased from SNR2 to SNR3. The value of SNR3 is set to be less than $Q_{out}$, e.g., less than $Q_{out}$ by offset2, with offset2 being the SNR estimation uncertainty at $Q_{out}$. Thus, at point B, the serving cell or network device decreases a signal-to-noise ratio of reference signals transmitted by the network device to the user device from a first signal-to-noise ratio (SNR2) to a second signal-to-noise ratio (SNR3), wherein the second signal-to-noise ratio is less than a lower signal-to-noise ratio threshold ($Q_{out}$).

5) During the time period T3, a sufficient time period is provided (e.g., T3) to allow a correctly operating user device to detect OOS (sending OOS indication to higher layers one or more times, as required), start an OOS timer and declare a RLF when the OOS timer expires. Thus, in T3, a correctly operating user device will be expected to detect an OOS and then declare or trigger a RLF. The time duration of T3 may, for example, be set according to eMTC (NB-IoT) RLM OOS requirements, e.g. the L1 evaluation time plus the duration of timer T310 (e.g., OOS timer). Thus, during time period T3, the serving cell/BS maintains a signal-to-noise ratio of the transmitted reference signals (at SNR3) to be less than the lower signal-to-noise ratio threshold ($Q_{out}$) for a first period of time (T3) that is a sufficient length of time to allow a correctly operating user device to detect an out-of-sync (OOS) status and subsequently declare a radio link failure (RLF) with respect to the connection.

6) At point C, the received SNR 210 is increased from SNR3 to back to SNR1. Thus, at point C, the serving cell/BS (or network device) increases the signal-to-noise ratio of the reference signals transmitted to the user device from the second signal-to-noise ratio (SNR3) to a third signal-to-noise ratio (SNR1), wherein the third signal-to-noise ratio (SNR1) is greater than an upper signal-to-noise ratio threshold ($Q_{in}$). Also, during period T4, the serving cell/BS (or network device) will maintain the signal-to-noise ratio of the transmitted reference signals to at least the third signal-to-noise ratio (SNR1) for a second period of time (e.g., T4) that is a sufficient length of time to allow a correctly operating user device to perform connection re-establishment after previously declaring a radio link failure with respect to the connection.

7) During the time period T4, the serving BS/cell (Cell 1) will detect whether the user device (e.g., eMTC UE) sends a random access preamble (e.g., PRACH or the NB-IoT UE sends NPRACH) to the Cell 1 for connection re-establishment during T4. If the user device detects OOS and declares RLF during T3 time, the (correctly operating) user device will start cell search and then detect Cell 1 again, and then send the random access preamble (e.g., PRACH or NPRACH) to the serving cell for connection re-establishment. If the user device does not send the random access preamble (PRACH or NPRACH), this means that that UE did not detect OOS during T3, and maintained the connection with Cell 1 without the need to re-establish connection (meaning that the user device did not operate correctly). Thus, as part of OOS test or RLM test for the user device, the serving cell/BS (or network device conducting the test) may confirm a receipt of a random access preamble for connection re-establishment from the user device. Receiving such a random access preamble confirms a correct operation of the user device, according to an example implementation. Other tests or confirmations may also be included within a RLM test or OOS test, for example.

With above OOS test procedure, the user device (e.g., eMTC/NB-IoT) OOS test requirements can be defined as following (one or more, or both of the following):

1) A correctly operating user device should complete or perform the uplink transmission according to (or in response to) the uplink grant during T2; and 2) A correctly operating user device should transmit the random access preamble (PRACH or NPRACH) for connection re-establishment during T4.

According to an example implementation, for a user device to pass the test, the rate of correct events observed during repeated tests should be at least 90%, for example. However, a drawback of the test procedure of example 1 is that during T4, the SNR (SNR1) should be maintained for a time period that is a sufficient length of time to allow a correctly operating user device to perform connection re-establishment (including cell search, and random access procedure) after previously declaring a radio link failure with respect to the connection. This test procedure of example 1 may be shortened according to the example test procedure of example 1.

Example 2

Test Procedure based on PUSCH (or NPUSCH) transmission for OOS test for user devices (e.g., for eMTC and NB-IoT UEs).

To reduce the time duration in T4, the serving cell may send an uplink grant to the user device to test whether the user device has already closed the connection with following RLM OOS test procedure:

Operations 1) to 6) are same as example 1.

7) During the time period T4, serving cell/BS provides the user device with an uplink grant for PUSCH (or NPUSCH) transmission.

If the user device correctly detects OOS and declared RLF in time during T3, the user device should not respond to the uplink grant in T4. In another words, if the user device responds to the uplink grant in T4 (with an Acknowledgement, data or other information or signal), this indicates that the user device is still in connected state, and thus the user device fails the RLM test.

In an example implementation, the cell/BS (or network device) may provide more than one UL grants to the UE during T4 to ensure the user device will get one UL grant if the user device is still in connected state With above OOS Test procedure in example 2, the user device (e.g., eMTC/NB-IoT) OOS test requirements can be defined as following (test may include 1 or both of the following requirements):

1) User device should complete the uplink transmission according to (or in response to) the uplink grant during T2.

2) User device should not have any uplink transmission during T4.

According to an example implementation, a rate of correct events observed during repeated tests should be at least 90%, e.g., in order for a user device to pass the test.

Figure 3:
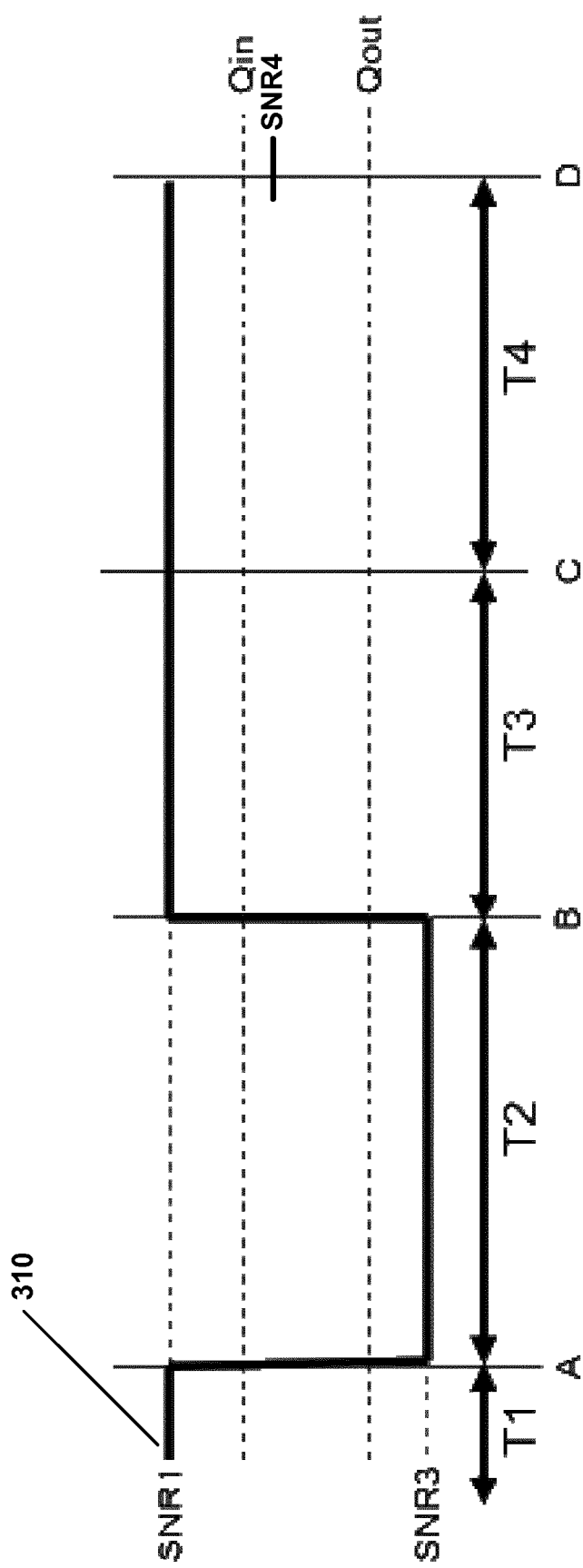
FIG. 3 is a diagram illustrating variation of received SNR for an example in-sync testing according to one or more example implementations.

FIG. 3 is a diagram illustrating variation of received SNR for an example in-sync testing according to one or more example implementations. (for test examples 3 and 4). In FIG. 3, signal strength is shown in a vertical axis, while time is shown in the horizontal axis. The SNR of the reference signals transmitted by the serving cell/serving BS and received by the user device is indicated by received SNR value 310, which varies over time. To conduct a test of a user device, a network device (e.g., operating as a serving cell or serving BS) may vary the signal power or signal strength of one or more signals transmitted by the network device, such as the reference signals (e.g., cell specific reference signals). An upper threshold ($Q_{in}$) and a lower threshold ($Q_{out}$) are also shown in FIG. 3.

The variation over time of the received SNR 310 is shown in FIG. 3. In an example implementation, the received SNR 310 may include: SNR1 (which is greater than $Q_{in}$) during time period T1; decrease at point A from SNR1 to SNR3 (which is less than $Q_{out}$; stay or maintain the received SNR 310 at SNR3 during time period T2; At point B, increase the received SNR 310 to SNR1 (which is greater than $Q_{in}$); maintain SNR at SNR1 for time period T3 and T4 until at least point D.

Two example test procedures are described with reference to FIG. 3. (Examples 3 and 4).

Example 3

Procedure based on PUSCH (or NPUSCH) transmission for In-Sync (IS) test for user devices (e.g., eMTC and NB-IoT UEs)

Example 3 may provide a test procedure to verify that the user device properly detects the out-of-sync (OOS) and in-sync (IS) for the purpose of monitoring downlink radio link quality from the serving cell/BS. According to an example implementation, an example eMTC (NB-IoT) RLM IS test procedure may be based mainly on UE PUSCH (NPUSCH) transmission is as follows (see FIG. 3 for the SNR variation of the serving cell, Cell 1):

1) During the time period T1, the user device sets up the connection with the serving cell, Cell 1, using a SNR for reference signals that is SNR1 (which is greater than $Q_{in}$).

2) At point A, SNR 310 is decreased from SNR1 to SNR3 (SNR3<$Q_{out}$, e.g., less than Qout by offset2, with offset2 being the SNR estimation uncertainty at $Q_{out}$). Thus, the serving cell/BS decreases a signal-to-noise ratio of reference signals transmitted by the network device to the user device from a first signal-to-noise ratio (SNR1) to a second signal-to-noise ratio (SNR3), wherein the second signal-to-noise ratio is less than a lower signal-to-noise ratio threshold ($Q_{in}$).

3) During the time period T2, the user device should detect it is in OOS at time point D. Due to T310 (OOS timer) time setting (OOS timer has not expired yet), the user device should not declare RLF. The duration of T2 may, for example, be equal to OOS evaluation time plus duration of timer T310 minus IS evaluation time. OOS evaluate time is the time required for a user device to switch from IS to OOS; and IS evaluation time is time required for a user device to switch from OOS to IS. Thus, for example, the serving cell/BS may maintain a signal-to-noise ratio of the transmitted reference signals (at SNR3) to be less than the lower signal-to-noise ratio threshold ($Q_{out}$) for a period of time that is a sufficient length of time to allow a correctly operating user device to detect an out-of-sync status with respect to the connection and short enough to prevent the correctly operating user device from declaring a radio link failure with respect to the connection.

4) At point B, SNR 310 is increased from SNR3 to SNR1. Right after point B, an uplink grant (e.g., MPDCCH scheduling for UL transmission) is sent to the user device. The user device should respond to the uplink grant, since the user device is in OOS status but has not triggered RLF. Thus, the serving cell/BS increases the signal-to-noise ratio of the reference signals transmitted to the user device from the second signal-to-noise ratio (SNR3) to a third signal-to-noise ratio (SNR1), wherein the third signal-to-noise ratio (SNR1) is greater than an upper signal-to-noise ratio threshold (Qin).

5) During the time period T3, the user device should detect it is back to IS at the end of T3 (based on SNR 310 being above $Q_{in}$). The duration of T3 may be set to equal to the IS evaluation time, for example.

6) During the time period T4. The user device should be in IS.

7) At the point C, another (or a second) uplink grant (or a second MPDCCH scheduling for UL transmission) is sent to the user device. The user device should respond to the uplink grant, since the user device should be in IS status. Thus, the serving cell/BS (or network device) should confirm that the network device receives an uplink transmission from the user device in response to the uplink resource grant within a period of time.

With above IS Test procedure in example 3, the user device (e.g., eMTC/NB-IoT) OOS test requirements can be defined as one or more of the following:

1) User device should conduct uplink (UL) transmission in response to the first UL grant sent at point B.

2) User device should conduct the second UL transmission in response to the second UL grant sent at point C According to an example implementation, in order to pass the test, the rate of correct events observed during repeated tests should be at least 90%.

Example 3 cannot verify whether user device triggers IS at the SNR below $Q_{in}$, so a different or parallel test procedure may be used (example 4). The first 3 operations/steps of example 4 are the same as example 3.

Example 4

Procedure based on uplink shared channel (e.g., PUSCH or NPUSCH) transmission for In-Sync (IS) test for user devices (e.g., eMTC and NB-IoT UEs)

Operations/steps 1)-3) for example 4 are the same as example 3.

4) At point B, SNR 310 is increased from SNR3 to SNR4, which is smaller than $Q_{in}$, e.g., smaller than $Q_{in}$ by offset1, with offset1 being the SNR estimation uncertainty at Qin. Right after point B, an uplink grant (e.g., MPDCCH scheduling for UL transmission) is sent by serving cell/BS to the user device. The (correctly operating) user device should respond to the uplink grant, since the user device is in OOS status but has not triggered RLF. Thus, the serving cell/BS increases the signal-to-noise ratio of the reference signals transmitted to the user device from the second signal-to-noise ratio (SNR3) to a third signal-to-noise ratio (SNR4), wherein the third signal-to-noise ratio is less than an upper signal-to-noise ratio threshold ($Q_{in}$) and greater than a lower signal-to-noise ratio threshold ($Q_{out}$).

5) During the time period T3, the user device should NOT detect that it is back to IS. The duration of T3 may be set to equal to the IS evaluation time. Thus, for example, the serving cell/BS may maintain (at SNR4) a signal-to-noise ratio of the transmitted reference signals to be less than the upper signal-to-noise ratio threshold ($Q_{in}$) and greater than the lower signal-to-noise ratio threshold ($Q_{out}$) for a second period of time that is a sufficient length of time to allow a correctly operating user device to declare a radio link failure (RLF) with respect to the connection. Thus, a correctly operating user device will declare a RLF.

6) During the time period T4, the user device should NOT be in IS.

7) At the point C, second uplink grant (e.g., a second MPDCCH scheduling for UL transmission) is sent to the user device. The user device should NOT respond to the uplink grant, since the user device should have triggered RLF (and thus the correctly operating user device is not connected to this serving cell/BS, and thus should not respond to any UL grants). Thus, the serving cell/BS (or network device conducting the test) should confirm that the network device does not receive an uplink transmission from the user device in response to the uplink grant within a third period of time. For example, if the user device correctly declared a RLF, then the user device will not respond to any resource grants.

With above IS Test procedure in example 4, the user device (e.g., eMTC/NB-IoT) OOS test requirements can be defined as one or more of the following:

1) User device should conduct the first uplink (UL) transmission in response to the first UL grant sent at point B.

2) User device should NOT conduct UL transmission in response to the second UL grant sent at point C.

According to an example implementation, a rate of correct events observed during repeated tests should be at least 90%, e.g., for the user device to pass the test.

Figure 4:
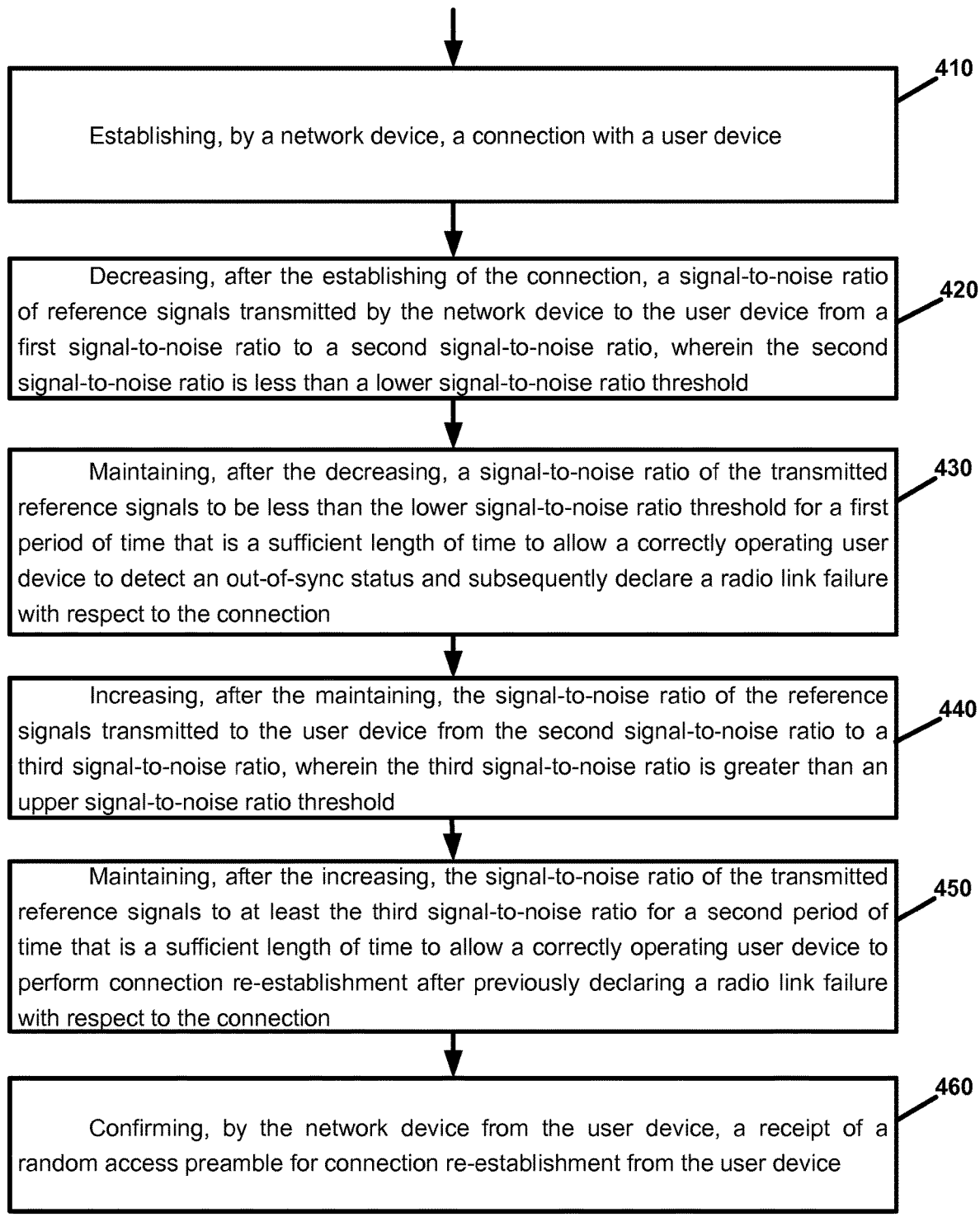
FIG. 4 is a flow chart illustrating operation of a network device according to an example implementation.

FIG. 4 is a flow chart illustrating operation of a network device according to an example implementation. Operation 410 includes establishing, by a network device, a connection with a user device. Operation 420 includes decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold. Operation 430 includes maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection. Operation 440 includes increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold. Operation 450 includes maintaining, after the increasing, the signal-to-noise ratio of the transmitted reference signals to at least the third signal-to-noise ratio for a second period of time that is a sufficient length of time to allow a correctly operating user device to perform connection re-establishment after previously declaring a radio link failure with respect to the connection. Operation 460 includes confirming, by the network device from the user device, a receipt of a random access preamble for connection re-establishment from the user device.

According to an example implementation of the method of FIG. 4, the third signal-to-noise ratio is sufficient to cause a user device, which previously declared a radio link failure and is not connected to the network device, to send a random access preamble for connection re-establishment to the network device.

According to an example implementation of the method of FIG. 4, the second signal-to-noise ratio is less than the lower signal-to-noise ratio threshold by at least a first offset.

According to an example implementation of the method of FIG. 4, the establishing a connection is performed based on the network device transmitting reference signals at a fourth signal-to-noise ratio that is greater than the upper signal-to-noise threshold, the method further comprising performing the following after performing the establishing and before performing the decreasing: decreasing, the signal-to-noise ratio of signals transmitted by the network device to the user device from the fourth signal-to-noise ratio to the first signal-to-noise ratio, wherein the first signal-to-noise ratio is between the lower signal-to-noise ratio threshold and the upper signal-to-noise ratio threshold; maintaining, after the decreasing the signal-to-noise ratio of signals transmitted by the network device to the user device from the fourth signal-to-noise ratio to the first signal-to-noise ratio, a signal-to-noise ratio of the transmitted reference signals to be between the lower signal-to-noise ratio threshold and the upper signal-to-noise ratio threshold for a third period of time that is a sufficient length to allow a incorrectly operating user device to detect an out-of-sync status and subsequently declare a radio link failure with respect to the connection; transmitting, after the maintaining the signal-to-noise ratio of the transmitted reference signals to be between the lower signal-to-noise ratio threshold and the upper signal-to-noise ratio threshold for a third period of time, an uplink resource grant by the network device to the user device; and confirming that the network device receives an uplink transmission from the user device in response to the uplink resource grant.

According to an example implementation of the method of FIG. 4, the lower signal-to-noise ratio threshold is at a signal-to-noise ratio at which a downlink signal cannot be reliably received; and the upper signal-to-noise ratio threshold is at a signal-to-noise ratio at which a downlink signal can be more reliably received than at the lower signal-to-noise ratio.

According to an example implementation of the method of FIG. 4, the lower signal-to-noise ratio threshold is $Q_{out}$ and corresponds to a block error rate of greater than or equal to 10% for a hypothetical downlink control channel transmission; and the upper signal-to-noise ratio threshold is $Q_{in}$ and corresponds to a block error rate of less than or equal to 2% for a hypothetical downlink control channel transmission.

According to an example implementation, an apparatus includes at least one processor and at least one memory including computer instructions, when executed by the at least one processor, cause the apparatus to: establish, by a network device, a connection with a user device; decrease, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintain, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; increase, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; maintain, after the increasing, the signal-to-noise ratio of the transmitted reference signals to at least the third signal-to-noise ratio for a second period of time that is a sufficient length of time to allow a correctly operating user device to perform connection re-establishment after previously declaring a radio link failure with respect to the connection; and confirm, by the network device from the user device, a receipt of a random access preamble for connection re-establishment from the user device.

According to an example implementation, an apparatus includes means (e.g., 802A/802B and/or 804, FIG. 8) for establishing, by a network device, a connection with a user device; means (e.g., 802A/802B and/or 804, FIG. 8) for decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; means (e.g., 802A/802B and/or 804, FIG. 8) for maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; means (e.g., 802A/802B and/or 804, FIG. 8) for increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; means (e.g., 802A/802B and/or 804, FIG. 8) for maintaining, after the increasing, the signal-to-noise ratio of the transmitted reference signals to at least the third signal-to-noise ratio for a second period of time that is a sufficient length of time to allow a correctly operating user device to perform connection re-establishment after previously declaring a radio link failure with respect to the connection; and means (e.g., 802A/802B and/or 804, FIG. 8) for confirming, by the network device from the user device, a receipt of a random access preamble for connection re-establishment from the user device.

According to an example implementation, a computer program product includes a computer-readable storage medium and storing executable code that, when executed by at least one data processing apparatus, is configured to cause the at least one data processing apparatus to perform a method including: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; maintaining, after the increasing, the signal-to-noise ratio of the transmitted reference signals to at least the third signal-to-noise ratio for a second period of time that is a sufficient length of time to allow a correctly operating user device to perform connection re-establishment after previously declaring a radio link failure with respect to the connection; and confirming, by the network device from the user device, a receipt of a random access preamble for connection re-establishment from the user device.

Figure 5:
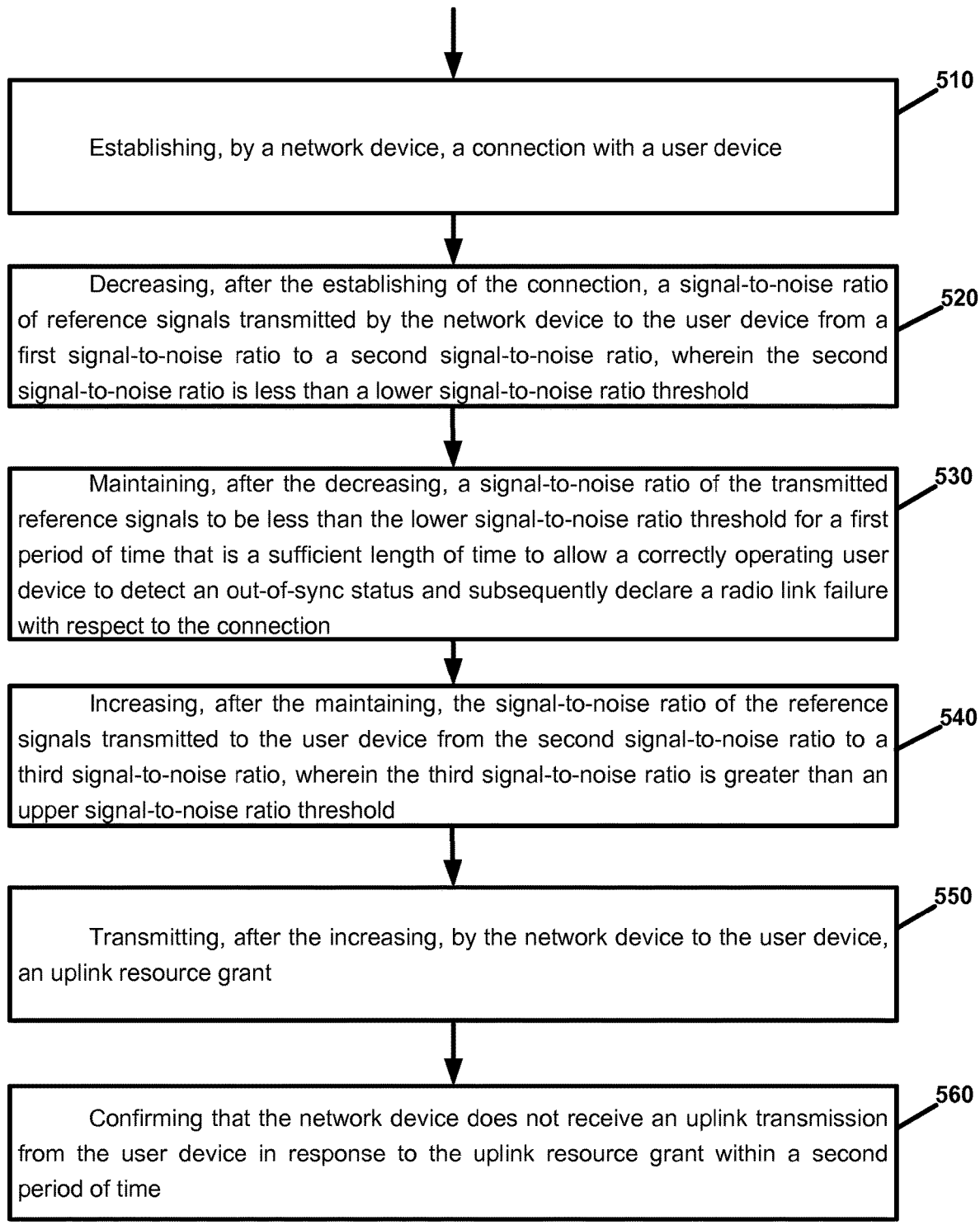
FIG. 5 is a flow chart illustrating operation of a network device according to another example implementation.

FIG. 5 is a flow chart illustrating operation of a network device according to another example implementation. Operation 510 includes establishing, by a network device, a connection with a user device. Operation 520 includes decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold. Operation 530 includes maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection. Operation 540 includes increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold. Operation 550 includes transmitting, after the increasing, by the network device to the user device, an uplink resource grant. Operation 560 includes confirming that the network device does not receive an uplink transmission from the user device in response to the uplink resource grant within a second period of time.

According to an example implementation of the method of FIG. 5, the third signal-to-noise ratio is sufficient to cause a user device to reliably receive an uplink resource grant.

According to an example implementation of the method of FIG. 5, the second signal-to-noise ratio is less than the lower signal-to-noise ratio threshold by at least a first offset.

According to an example implementation of the method of FIG. 5, the establishing a connection is performed based on the network device transmitting reference signals at a fourth signal-to-noise ratio that is greater than the upper signal-to-noise threshold, the method further comprising performing the following after performing the establishing and before performing the decreasing: decreasing, the signal-to-noise ratio of signals transmitted by the network device to the user device from the fourth signal-to-noise ratio to the first signal-to-noise ratio, wherein the first signal-to-noise ratio is between the lower signal-to-noise ratio threshold and the upper signal-to-noise ratio threshold; maintaining, after the decreasing the signal-to-noise ratio of signals transmitted by the network device to the user device from the fourth signal-to-noise ratio to the first signal-to-noise ratio, a signal-to-noise ratio of the transmitted reference signals to be between the lower signal-to-noise ratio threshold and the upper signal-to-noise ratio threshold for a third period of time that is a sufficient length to allow a incorrectly operating user device to detect an out-of-sync status and subsequently declare a radio link failure with respect to the connection; transmitting, after the maintaining the signal-to-noise ratio of the transmitted reference signals to be between the lower signal-to-noise ratio threshold and the upper signal-to-noise ratio threshold for a third period of time, an uplink resource grant by the network device to the user device; and confirming that the network device receives an uplink transmission from the user device in response to the uplink resource grant.

According to an example implementation of the method of FIG. 5, the lower signal-to-noise ratio threshold is at a signal-to-noise ratio at which a downlink signal cannot be reliably received; and the upper signal-to-noise ratio threshold is at a signal-to-noise ratio at which a downlink signal can be more reliably received than at the lower signal-to-noise ratio.

According to an example implementation of the method of FIG. 5, the lower signal-to-noise ratio threshold is $Q_{out}$ and corresponds to a block error rate of greater than or equal to 10% for a hypothetical downlink control channel transmission; and the upper signal-to-noise ratio threshold is $Q_{in}$ and corresponds to a block error rate of less than or equal to 2% for a hypothetical downlink control channel transmission.

According to an example implementation, an apparatus includes at least one processor and at least one memory including computer instructions, when executed by the at least one processor, cause the apparatus to: establish, by a network device, a connection with a user device; decrease, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintain, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; increase, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; transmit, after the increasing, by the network device to the user device, an uplink resource grant; and confirm that the network device does not receive an uplink transmission from the user device in response to the uplink resource grant within a second period of time.

According to an example implementation, an apparatus includes means (e.g., 802A/802B and/or 804, FIG. 8) for establishing, by a network device, a connection with a user device; means (e.g., 802A/802B and/or 804, FIG. 8) for decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; means (e.g., 802A/802B and/or 804, FIG. 8) for maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; means (e.g., 802A/802B and/or 804, FIG. 8) for increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; means (e.g., 802A/802B and/or 804, FIG. 8) for transmitting, after the increasing, by the network device to the user device, an uplink resource grant; and means (e.g., 802A/802B and/or 804, FIG. 8) for confirming that the network device does not receive an uplink transmission from the user device in response to the uplink resource grant within a second period of time.

According to an example implementation, a computer program product includes a computer-readable storage medium and storing executable code that, when executed by at least one data processing apparatus, is configured to cause the at least one data processing apparatus to perform a method including: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; transmitting, after the increasing, by the network device to the user device, an uplink resource grant; and confirming that the network device does not receive an uplink transmission from the user device in response to the uplink resource grant within a second period of time.

Figure 6:
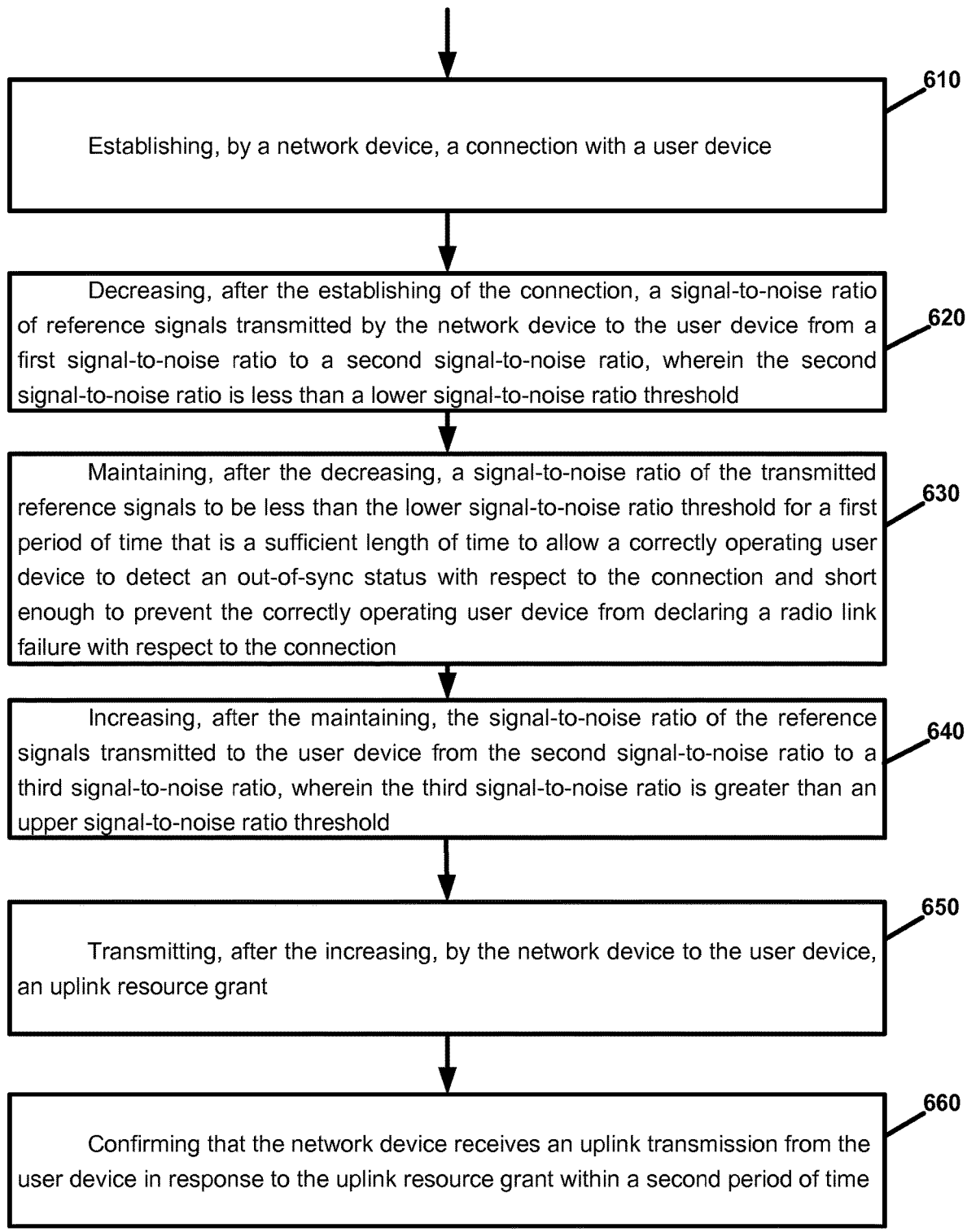
FIG. 6 is a flow chart illustrating operation of a network device according to another example implementation.

FIG. 6 is a flow chart illustrating operation of a network device according to another example implementation. Operation 610 includes establishing, by a network device, a connection with a user device. Operation 620 includes decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold. Operation 630 includes maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection. Operation 640 includes increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold. Operation 650 includes transmitting, after the increasing, by the network device to the user device, an uplink resource grant. Operation 660 includes confirming that the network device receives an uplink transmission from the user device in response to the uplink resource grant within a second period of time.

According to an example implementation of the method of FIG. 6, the transmitting an uplink resource grant includes at least one of the following: transmitting, by the network device to the user device before end of an in-sync evaluation period after the increasing, an uplink resource grant; and transmitting, by the network device to the user device after end of an in-sync evaluation period after the increasing, an uplink resource grant.

According to an example implementation of the method of FIG. 6, the lower signal-to-noise ratio threshold is at a signal-to-noise ratio at which a downlink signal cannot be reliably received; and the upper signal-to-noise ratio threshold is at a signal-to-noise ratio at which a downlink signal can be more reliably received than at the lower signal-to-noise ratio.

According to an example implementation of the method of FIG. 6, the lower signal-to-noise ratio threshold is $Q_{out}$ and corresponds to a block error rate of greater than or equal to 10% for a hypothetical downlink control channel transmission; and the upper signal-to-noise ratio threshold is $Q_{in}$ and corresponds to a block error rate of less than or equal to 2% for a hypothetical downlink control channel transmission.

According to an example implementation, an apparatus includes at least one processor and at least one memory including computer instructions, when executed by the at least one processor, cause the apparatus to: establish, by a network device, a connection with a user device; decrease, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintain, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; increase, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; transmit, after the increasing, by the network device to the user device, an uplink resource grant; and confirm that the network device receives an uplink transmission from the user device in response to the uplink resource grant within a second period of time.

According to an example implementation, an apparatus includes means (e.g., 802A/802B and/or 804, FIG. 8) for establishing, by a network device, a connection with a user device; means (e.g., 802A/802B and/or 804, FIG. 8) for decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; means (e.g., 802A/802B and/or 804, FIG. 8) for maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; means (e.g., 802A/802B and/or 804, FIG. 8) for increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; means (e.g., 802A/802B and/or 804, FIG. 8) for transmitting, after the increasing, by the network device to the user device, an uplink resource grant; and means (e.g., 802A/802B and/or 804, FIG. 8) for confirming that the network device receives an uplink transmission from the user device in response to the uplink resource grant within a second period of time.

According to an example implementation, a computer program product includes a computer-readable storage medium and storing executable code that, when executed by at least one data processing apparatus, is configured to cause the at least one data processing apparatus to perform a method including: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold; transmitting, after the increasing, by the network device to the user device, an uplink resource grant; and confirming that the network device receives an uplink transmission from the user device in response to the uplink resource grant within a second period of time.

Figure 7:
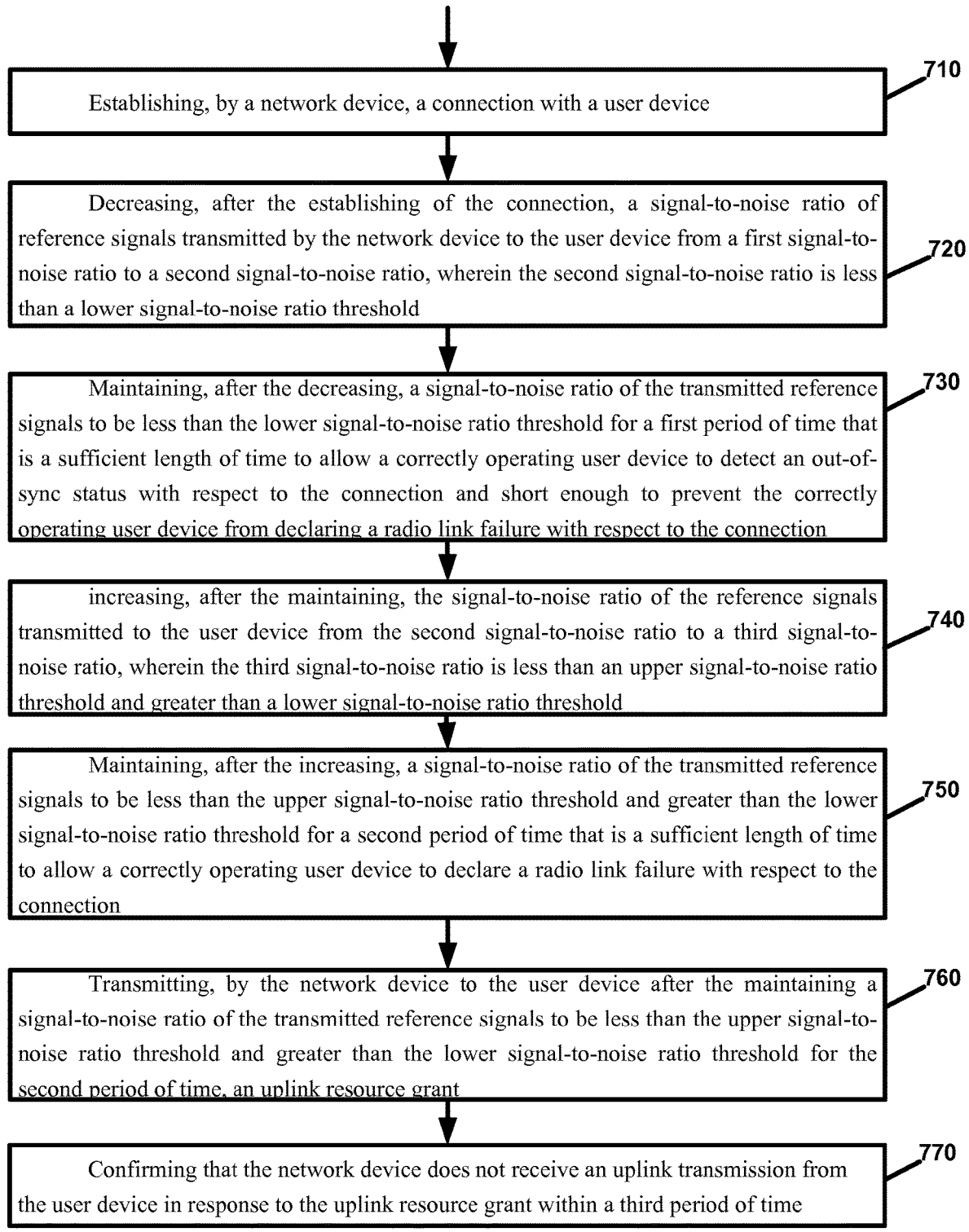
FIG. 7 is a flow chart illustrating operation of a network device according to another example implementation.

FIG. 7 is a flow chart illustrating operation of a network device according to another example implementation. Operation 710 includes establishing, by a network device, a connection with a user device. Operation 720 includes decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold. Operation 730 includes maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection. Operation 740 includes increasing, after the maintaining, the signal-to-noise ratio of the reference signals transmitted to the user device from the second signal-to-noise ratio to a third signal-to-noise ratio, wherein the third signal-to-noise ratio is less than an upper signal-to-noise ratio threshold and greater than a lower signal-to-noise ratio threshold. Operation 750 includes maintaining, after the increasing, a signal-to-noise ratio of the transmitted reference signals to be less than the upper signal-to-noise ratio threshold and greater than the lower signal-to-noise ratio threshold for a second period of time that is a sufficient length of time to allow a correctly operating user device to declare a radio link failure with respect to the connection. Operation 760 includes transmitting, by the network device to the user device after the maintaining a signal-to-noise ratio of the transmitted reference signals to be less than the upper signal-to-noise ratio threshold and greater than the lower signal-to-noise ratio threshold for the second period of time, an uplink resource grant. And, operation 770 includes confirming that the network device does not receive an uplink transmission from the user device in response to the uplink resource grant within a third period of time.

According to an example implementation of the method of FIG. 7, the lower signal-to-noise ratio threshold is at a signal-to-noise ratio at which a downlink signal cannot be reliably received; and the upper signal-to-noise ratio threshold is at a signal-to-noise ratio at which a downlink signal can be more reliably received than at the lower signal-to-noise ratio.

According to an example implementation of the method of FIG. 7, the lower signal-to-noise ratio threshold is $Q_{out}$ and corresponds to a block error rate of greater than or equal to 10% for a hypothetical downlink control channel transmission; and the upper signal-to-noise ratio threshold is $Q_{in}$ and corresponds to a block error rate of less than or equal to 2% for a hypothetical downlink control channel transmission.

According to an example implementation, an apparatus includes at least one processor and at least one memory including computer instructions, when executed by the at least one processor, cause the apparatus to: establish, by a network device, a connection with a user device; decrease, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintain, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; increase, after the maintaining, the signal-to-noise ratio of the reference signals transmitted to the user device from the second signal-to-noise ratio to a third signal-to-noise ratio, wherein the third signal-to-noise ratio is less than an upper signal-to-noise ratio threshold and greater than a lower signal-to-noise ratio threshold; maintain, after the increasing, a signal-to-noise ratio of the transmitted reference signals to be less than the upper signal-to-noise ratio threshold and greater than the lower signal-to-noise ratio threshold for a second period of time that is a sufficient length of time to allow a correctly operating user device to declare a radio link failure with respect to the connection; transmit, by the network device to the user device after the maintaining a signal-to-noise ratio of the transmitted reference signals to be less than the upper signal-to-noise ratio threshold and greater than the lower signal-to-noise ratio threshold for the second period of time, an uplink resource grant; and confirm that the network device does not receive an uplink transmission from the user device in response to the uplink resource grant within a third period of time.

According to an example implementation, an apparatus includes means (e.g., 802A/802B and/or 804, FIG. 8) for establishing, by a network device, a connection with a user device; means (e.g., 802A/802B and/or 804, FIG. 8) for decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; means (e.g., 802A/802B and/or 804, FIG. 8) for maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; means (e.g., 802A/802B and/or 804, FIG. 8) for, after the maintaining, the signal-to-noise ratio of the reference signals transmitted to the user device from the second signal-to-noise ratio to a third signal-to-noise ratio, wherein the third signal-to-noise ratio is less than an upper signal-to-noise ratio threshold and greater than a lower signal-to-noise ratio threshold; means (e.g., 802A/802B and/or 804, FIG. 8) for maintaining, after the increasing, a signal-to-noise ratio of the transmitted reference signals to be less than the upper signal-to-noise ratio threshold and greater than the lower signal-to-noise ratio threshold for a second period of time that is a sufficient length of time to allow a correctly operating user device to declare a radio link failure with respect to the connection; means (e.g., 802A/802B and/or 804, FIG. 8) for transmitting, by the network device to the user device after the maintaining a signal-to-noise ratio of the transmitted reference signals to be less than the upper signal-to-noise ratio threshold and greater than the lower signal-to-noise ratio threshold for the second period of time, an uplink resource grant; and means (e.g., 802A/802B and/or 804, FIG. 8) for confirming that the network device does not receive an uplink transmission from the user device in response to the uplink resource grant within a third period of time.

According to an example implementation, a computer program product includes a computer-readable storage medium and storing executable code that, when executed by at least one data processing apparatus, is configured to cause the at least one data processing apparatus to perform a method including: establishing, by a network device, a connection with a user device; decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold; maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status with respect to the connection and short enough to prevent the correctly operating user device from declaring a radio link failure with respect to the connection; increasing, after the maintaining, the signal-to-noise ratio of the reference signals transmitted to the user device from the second signal-to-noise ratio to a third signal-to-noise ratio, wherein the third signal-to-noise ratio is less than an upper signal-to-noise ratio threshold and greater than a lower signal-to-noise ratio threshold; maintaining, after the increasing, a signal-to-noise ratio of the transmitted reference signals to be less than the upper signal-to-noise ratio threshold and greater than the lower signal-to-noise ratio threshold for a second period of time that is a sufficient length of time to allow a correctly operating user device to declare a radio link failure with respect to the connection; transmitting, by the network device to the user device after the maintaining a signal-to-noise ratio of the transmitted reference signals to be less than the upper signal-to-noise ratio threshold and greater than the lower signal-to-noise ratio threshold for the second period of time, an uplink resource grant; and confirming that the network device does not receive an uplink transmission from the user device in response to the uplink resource grant within a third period of time.

Figure 8:
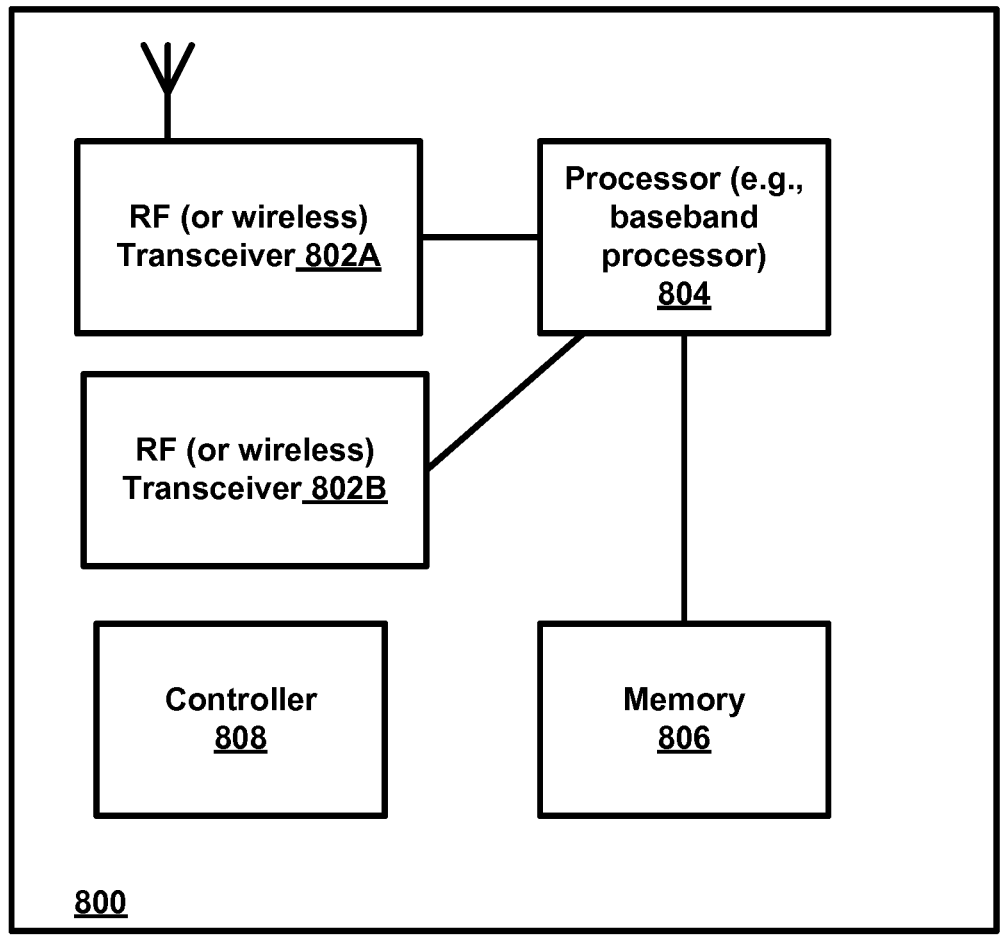
FIG. 8 is a block diagram of a node or wireless station (e.g., network device, base station/access point or mobile station/user device/UE) according to an example implementation.

FIG. 8 is a block diagram of a wireless station (e.g., AP or user device) 800 according to an example implementation. The wireless station 800 may include, for example, one or two RF (radio frequency) or wireless transceivers 802A, 802B, where each wireless transceiver includes a transmitter to transmit signals and a receiver to receive signals. The wireless station also includes a processor or control unit/entity (controller) 804 to execute instructions or software and control transmission and receptions of signals, and a memory 806 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of performing an out-of-sync test procedure for a wireless user device, said method comprising:
    establishing, by a network device, a connection with a user device;
    decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold;
    maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection;
    increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold;
    transmitting, after the increasing, by the network device to the user device, an uplink resource grant; and
    confirming that the network device does not receive an uplink transmission from the user device in response to the uplink resource grant within a second period of time;
    wherein the upper signal-to-noise ratio threshold is $Q_{in}$ and corresponds to a block error rate of less than or equal to 2% for a hypothetical downlink control channel transmission.

2. The method of claim 1, wherein the third signal-to-noise ratio is sufficient to cause a user device to reliably receive an uplink resource grant.

3. The method of claim 1, wherein the second signal-to-noise ratio is less than the lower signal-to-noise ratio threshold by at least a first offset.

4. The method of claim 1, wherein the establishing a connection is performed based on the network device transmitting reference signals at a fourth signal-to-noise ratio that is greater than the upper signal-to-noise threshold, the method further comprising, after performing the establishing and before performing the decreasing:
    decreasing, the signal-to-noise ratio of signals transmitted by the network device to the user device from the fourth signal-to-noise ratio to the first signal-to-noise ratio, wherein the first signal-to-noise ratio is between the lower signal-to-noise ratio threshold and the upper signal-to-noise ratio threshold;
    maintaining, after the decreasing the signal-to-noise ratio of signals transmitted by the network device to the user device from the fourth signal-to-noise ratio to the first signal-to-noise ratio, a signal-to-noise ratio of the transmitted reference signals to be between the lower signal-to-noise ratio threshold and the upper signal-to-noise ratio threshold for a third period of time that is a sufficient length to allow a incorrectly operating user device to detect an out-of-sync status and subsequently declare a radio link failure with respect to the connection;

transmitting, after the maintaining the signal-to-noise ratio of the transmitted reference signals to be between the lower signal-to-noise ratio threshold and the upper signal-to-noise ratio threshold for a third period of time, an uplink resource grant by the network device to the user device; and confirming that the network device receives an uplink transmission from the user device in response to the uplink resource grant.

5. The method of claim 1, wherein:

the lower signal-to-noise ratio threshold is at a signal-to-noise ratio at which a downlink signal cannot be reliably received; and wherein the upper signal-to-noise ratio threshold is at a signal-to-noise ratio at which a downlink signal can be more reliably received than at the lower signal-to-noise ratio.

6. The method of claim 1, wherein:

the lower signal-to-noise ratio threshold is $Q_{out}$ and corresponds to a block error rate of greater than or equal to 10% for a hypothetical downlink control channel transmission.

7. An apparatus, comprising:

at least one processor; and at least one memory including computer instructions which, when executed by the at least one processor, cause the apparatus to at least:

establish a connection with a user device;

decrease, after the establishing of the connection, a signal-to-noise ratio of reference signals transmitted by the apparatus to the user device from a first signal-to-noise ratio to a second signal-to-noise ratio, wherein the second signal-to-noise ratio is less than a lower signal-to-noise ratio threshold;

maintain, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection;

increase, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold;

transmit, after the increasing, to the user device, an uplink resource grant; and confirm that the apparatus does not receive an uplink transmission from the user device in response to the uplink resource grant within a second period of time;

wherein the upper signal-to-noise ratio threshold is $Q_{in}$ and corresponds to a block error rate of less than or equal to 2% for a hypothetical downlink control channel transmission.

8. The apparatus of claim 7, wherein the third signal-to-noise ratio is sufficient to cause a user device to reliably receive an uplink resource grant.

9. The apparatus of claim 7, wherein the second signal-to-noise ratio is less than the lower signal-to-noise ratio threshold by at least a first offset.

10. The apparatus of claim 7, wherein:

the establishing a connection is performed based on the apparatus transmitting reference signals at a fourth signal-to-noise ratio that is greater than the upper signal-to-noise threshold; and wherein the at least one memory and the processor are further configured to cause the apparatus, after performing the establishing and before performing the decreasing, to:

decrease, the signal-to-noise ratio of signals transmitted by the apparatus to the user device from the fourth signal-to-noise ratio to the first signal-to-noise ratio, wherein the first signal-to-noise ratio is between the lower signal-to-noise ratio threshold and the upper signal-to-noise ratio threshold;

maintain, after the decreasing the signal-to-noise ratio of signals transmitted by the apparatus to the user device from the fourth signal-to-noise ratio to the first signal-to-noise ratio, a signal-to-noise ratio of the transmitted reference signals to be between the lower signal-to-noise ratio threshold and the upper signal-to-noise ratio threshold for a third period of time that is a sufficient length to allow a incorrectly operating user device to detect an out-of-sync status and subsequently declare a radio link failure with respect to the connection;

transmit, after the maintaining the signal-to-noise ratio of the transmitted reference signals to be between the lower signal-to-noise ratio threshold and the upper signal-to-noise ratio threshold for a third period of time, an uplink resource grant to the user device; and confirm that the apparatus receives an uplink transmission from the user device in response to the uplink resource grant.

11. The apparatus of claim 7, wherein:

the lower signal-to-noise ratio threshold is at a signal-to-noise ratio at which a downlink signal cannot be reliably received; and wherein the upper signal-to-noise ratio threshold is at a signal-to-noise ratio at which a downlink signal can be more reliably received than at the lower signal-to-noise ratio.

12. The apparatus of claim 7, wherein:

the lower signal-to-noise ratio threshold is $Q_{out}$ and corresponds to a block error rate of greater than or equal to 10% for a hypothetical downlink control channel transmission.

13. A computer program product embodied on a non-transitory computer-readable storage medium, said medium storing executable code that, when executed by at least one apparatus, is configured to cause the at least one apparatus to perform a method including:

establishing, by a network device, a connection with a user device;

decreasing, after the establishing of the connection, a signal-to-noise ratio of reference signals transmitted by the network device to the user device from a first signal-to-noise ratio to a second signal-to-noise ratio, wherein the second signal-to-noise ratio is less than a lower signal-to-noise ratio threshold;

maintaining, after the decreasing, a signal-to-noise ratio of the transmitted reference signals to be less than the lower signal-to-noise ratio threshold for a first period of time that is a sufficient length of time to allow a correctly operating user device to detect an out-of-sync status and subsequently declare a radio link failure with respect to the connection;

increasing, after the maintaining, the signal-to-noise ratio of the reference signals transmitted to the user device from the second signal-to-noise ratio to a third signal-to-noise ratio, wherein the third signal-to-noise ratio is greater than an upper signal-to-noise ratio threshold;

transmitting, after the increasing, by the network device to the user device, an uplink resource grant; and confirming that the network device does not receive an uplink transmission from the user device in response to the uplink resource grant within a second period of time;

wherein the upper signal-to-noise ratio threshold is $Q_{in}$ and corresponds to a block error rate of less than or equal to 2% for a hypothetical downlink control channel transmission.

14. A method comprising:

establishing, by a user device, a connection with a network device;

receiving at the user device, after the establishing of the connection, reference signals transmitted by the network device with a signal-to-noise ratio decreasing from a first signal-to-noise ratio to a second signal-to-noise ratio, wherein the second signal-to-noise ratio is less than a lower signal-to-noise ratio threshold;

receiving at the user device, after the decreasing, the transmitted reference signals with a signal-to-noise ratio, which is less than the lower signal-to-noise ratio threshold, for a first period of time;

detecting by the user device during the first period of time an out-of-sync status and subsequently declaring a radio link failure with respect to the connection;

receiving at the user device, after the declaring, the transmitted reference signals with a signal-to-noise ratio increasing from the second signal-to-noise ratio to a third signal-to-noise ratio, wherein the third signal-to-noise ratio is greater than an upper signal-to-noise ratio threshold;

receiving at the user device, after the increasing, an uplink resource grant from the network device; and not transmitting an uplink transmission from the user device in response to the uplink resource grant within a second period of time in an out-of-sync test procedure for the user device;

wherein the upper signal-to-noise ratio threshold is $Q_{in}$ and corresponds to a block error rate of less than or equal to 2% for a hypothetical downlink control channel transmission.

15. The method of claim 14, wherein the third signal-to-noise ratio is sufficient to cause a user device to reliably receive an uplink resource grant.

16. The method of claim 14, wherein the second signal-to-noise ratio is less than the lower signal-to-noise ratio threshold by at least a first offset.

17. The method of claim 14, wherein:

the lower signal-to-noise ratio threshold is $Q_{out}$ and corresponds to a block error rate of greater than or equal to 10% for a hypothetical downlink control channel transmission.

18. An apparatus, comprising:

at least one processor; and at least one memory including computer instructions which, when executed by the at least one processor, cause the apparatus to at least:

establish a connection with a network device;

receive after the establishing of the connection, reference signals transmitted by the network device with a signal-to-noise ratio decreasing from a first signal-to-noise ratio to a second signal-to-noise ratio, wherein the second signal-to-noise ratio is less than a lower signal-to-noise ratio threshold;

receive after the decreasing, the transmitted reference signals with a signal-to-noise ratio, which is less than the lower signal-to-noise ratio threshold, for a first period of time;

detect during the first period of time an out-of-sync status and subsequently declare a radio link failure with respect to the connection;

receive, after the declaring, the transmitted reference signals with a signal-to-noise ratio increasing from the second signal-to-noise ratio to a third signal-to-noise ratio, wherein the third signal-to-noise ratio is greater than an upper signal-to-noise ratio threshold;

receive, after the increasing, an uplink resource grant from the network device; and not transmit an uplink transmission in response to the uplink resource grant within a second period of time in out-of-sync test procedure for the apparatus;

wherein the upper signal-to-noise ratio threshold is $Q_{in}$ and corresponds to a block error rate of less than or equal to 2% for a hypothetical downlink control channel transmission.

19. The apparatus of claim 18, wherein the third signal-to-noise ratio is sufficient to cause a user device to reliably receive an uplink resource grant.

20. The apparatus of claim 18, wherein the second signal-to-noise ratio is less than the lower signal-to-noise ratio threshold by at least a first offset.

21. The apparatus of claim 18, wherein:

the lower signal-to-noise ratio threshold is $Q_{out}$ and corresponds to a block error rate of greater than or equal to 10% for a hypothetical downlink control channel transmission.

* * * * *